(12) United States Patent
Brabb et al.

(10) Patent No.: US 9,187,066 B2
(45) Date of Patent: Nov. 17, 2015

(54) ELECTRICALLY DRIVEN SET AND RELEASE HAND BRAKE FOR RAIL CARS

(71) Applicants: David C. Brabb, Westmont, IL (US); Anand R. Vithani, Addison, IL (US); Kenneth L Martin, Pueblo, CO (US); Howard R. Sommerfeld, Oak Forest, IL (US); Graydon Booth, Chicago, IL (US)

(72) Inventors: David C. Brabb, Westmont, IL (US); Anand R. Vithani, Addison, IL (US); Kenneth L Martin, Pueblo, CO (US); Howard R. Sommerfeld, Oak Forest, IL (US); Graydon Booth, Chicago, IL (US)

(73) Assignee: Sharma & Associates, INC., Countryside, IL (US)

( * ) Notice: Subject to any disclaimer, the term of this patent is extended or adjusted under 35 U.S.C. 154(b) by 0 days.

(21) Appl. No.: 14/082,763

(22) Filed: Nov. 18, 2013

(65) Prior Publication Data
US 2015/0142284 A1    May 21, 2015

(51) Int. Cl.
*B60T 7/08* (2006.01)
*B60T 7/10* (2006.01)
*B61H 13/02* (2006.01)
*B60T 13/74* (2006.01)

(52) U.S. Cl.
CPC ............... *B60T 7/085* (2013.01); *B60T 7/107* (2013.01); *B60T 13/746* (2013.01); *B61H 13/02* (2013.01)

(58) Field of Classification Search
None
See application file for complete search history.

(56) References Cited

U.S. PATENT DOCUMENTS

| | | | |
|---|---|---|---|
| 4,368,648 A | 1/1983 | Housman et al. | |
| 4,795,002 A * | 1/1989 | Burgei et al. | 188/2 D |
| 4,874,065 A * | 10/1989 | Engle | 188/265 |
| 5,469,941 A * | 11/1995 | Horvath | 188/107 |
| 6,427,811 B1 | 8/2002 | Wedge et al. | |
| 6,755,284 B2 * | 6/2004 | Revelis et al. | 188/2 D |
| 6,848,754 B2 | 2/2005 | Ring et al. | |
| 6,913,325 B2 | 7/2005 | Michel et al. | |
| 7,011,190 B2 | 3/2006 | Moriarity et al. | |
| 7,121,388 B2 * | 10/2006 | Ring et al. | 188/153 R |
| 7,987,951 B2 | 8/2011 | Raz | |
| 8,839,915 B2 * | 9/2014 | Vithani et al. | 188/1.11 E |
| 2004/0150259 A1 * | 8/2004 | Michel et al. | 303/2 |
| 2005/0121971 A1 * | 6/2005 | Ring | 303/7 |
| 2006/0016647 A1 * | 1/2006 | Engle | 188/235 |

OTHER PUBLICATIONS

David C. Brabb et al : Freight Car Electrically Driven Set & Release Hand Brake (EDHB); Sep. 21-22; RTD2011-67031 C.
Sharma & Associates, Inc.; Freight Car Electrically Driven Set & Release Hand Brake (EDHB); Sep. 2011; RTDF2011-67031.

* cited by examiner

*Primary Examiner* — Mussa A Shaawat
(74) *Attorney, Agent, or Firm* — James Ray and Associates, LLC.; Alexander Pokot

(57) ABSTRACT

An apparatus for a hand brake includes a gear assembly, an electric motor coupled to the gear assembly, one or more sensors configured to sense at least one of the released and set states, a controller coupled to the electric motor and to the one or more sensors, the controller is configured to operate the electric motor in accordance with a predetermined logic algorithm so as to move the chain between the released and set states, and a device being movable between a first position wherein the device engages only the hand wheel and wherein the hand wheel is used to move the chain between the released and set states and a second position wherein the device engages both the hand wheel and a gear in the gear assembly and wherein the electric motor is operable to move the chain between the released and set states.

20 Claims, 8 Drawing Sheets

ELECTRICALLY DRIVEN SET AND RELEASE HAND BRAKE FOR RAIL CARS

STATEMENT REGARDING FEDERALLY SPONSORED RESEARCH AND DEVELOPMENT

This invention was made with government support under Contract DTFR53-07-D-00001 Task Order 005 awarded by the Federal Railroad Administration (FRA). The government has certain rights in the invention.

FIELD OF THE INVENTION

The present invention relates, in general, to Association of American Railroads (AAR) hand brakes for rail cars and, more particularly, this invention relates to an electrically driven set and release hand brake for rail cars and, yet more particularly, the instant invention relates to an apparatus configured to electrically set and release a hand brake on a rail car that can be transitioned between manual and powered operating modes.

REFERENCE TO SEQUENCE LISTING, A TABLE, OR A COMPUTER PROGRAM LISTING COMPACT DISC APPENDIX

N/A

BACKGROUND OF THE INVENTION

As is generally well known, freight railroads have been attempting for quite some time to eliminate train crew injuries that occur during the process of applying and releasing freight car hand brakes. Currently, a person must crank a handle or turn a wheel, usually in awkward positions, to set hand brakes to appropriate chain loads, about 125 pounds applied at the hand brake wheel. This condition often leads to back injuries or trips/falls. If the person slips or the hand brake's mechanism fails to engage, injuries can occur. Also, there are inherent safety issues with the physical climbing of ladders to operate the hand brakes and as well as the requirement to sometimes go in between rail cars to access the hand brakes. It is also generally known that a manual process of releasing hand brakes also causes injuries due to many of the same reasons as those that cause injuries when applying a hand brake. Finally, hand brakes are often left unreleased or partially released, during car movement, for various reasons. These unreleased or partially released hand brakes result in slid flats or otherwise damaged wheels which in turn can damage rail cars, lading and track.

Prior to the conception and design of the instant invention, efforts have been made to alleviate the above described problems on AAR group N hand brakes. One design effort focused on adapting a group N hand brake with a variety of pneumatic valves to channel air for actuation of a ratchet and pawl type drive train. This adaptation worked fairly well in that the use of the car's air was slow enough that it could be activated using emergency reservoir air without compromising the air brake system functionality. The design used many valves that posed challenges. Its footprint was about twice the size of a normal brake.

The second designed effort also focused on a pneumatically operated set and release system in combination with a Group N hand brake, a large air reservoir, a spring over air system, and multiple valves, all enclosed in a large rectangular covered frame that took up about a third of the end of a freight car and weighed around 1000 pounds (over 10 times the weight of current hand brakes). Although this design worked fairly well, it was not practical for many reasons. Its size (in some cases interfered with safety appliances such as ladders), weight, and the absence of normal manual functionality (no vertical wheel for manual operation, just a pull-push handle) made it a fairly impractical design.

Additionally, it has been found that air motors require more air volume and/or a higher supply rate than what is practically available on a freight rail car. The use of air requires a large sized reservoir to hold a controlled amount of compressed air. After an application or a release, a greater than desirable wait time is required for charging of the reservoir before the next hand brake operation can be under taken.

Therefore, there is a need for a practical and cost effective apparatus to set and release hand brake on rail cars without a manual effort from operating personnel.

SUMMARY OF THE INVENTION

The invention provides an apparatus for a hand brake having a hand brake housing, a drum mounted for rotation within the housing and having a chain supported thereon, a mechanism manually operable to move the chain between released and set states, the mechanism at least including a drive shaft extending outwardly from a front surface of the housing and having a proximal end thereof connected to the mechanism, and a hand wheel mounted on a distal end of the drive shaft for rotation therewith. The apparatus comprises a gear assembly, an electric motor coupled to the gear assembly, one or more sensors configured to sense at least one of the released and set states, a controller coupled to the electric motor and to the one or more sensors, the controller is configured to operate the electric motor in accordance with a predetermined logic algorithm so as to move the chain between the released and set states, and a device being movable between a first position wherein the device engages only the hand wheel and wherein the hand wheel is used to move the chain between the released and set states and a second position wherein the device engages both the hand wheel and a gear in the gear assembly and wherein the electric motor is operable to move the chain between the released and set states.

In accordance with another embodiment, the invention provides a hand brake comprising a housing, a drum mounted for rotation within the housing, a chain supported on the drum, a gear attached to the drum for a rotation therewith, an electric motor coupled to the gear, a lock assembly configured to selectively engage and disengage teeth of the gear, and a controller coupled to the electric motor and to the lock assembly, the controller is configured to operate the electric motor in accordance with a predetermined logic algorithm so as to move the chain between released and set states. The lock assembly includes a lock pawl mounted for a rotation so as to selectively engage and disengage the teeth of the gear, a spring configured to bias the lock pawl for engagement with the teeth of the gear, and a solenoid coupled to the pawl and operable by the controller to cause the rotation of the lock pawl in a direction to disengage the lock pawl from the teeth of the gear. The hand brake may further include a member configured to manually rotate the lock pawl.

OBJECTS OF THE INVENTION

It is, therefore, one of the primary objects of the present invention to provide an apparatus configured to electrically set and release a rail car hand brake.

Another object of the present invention is to provide an apparatus configured to electrically set and release a rail car hand brake that includes a device to transition the rail car hand brake between manual and powered operating modes.

Yet another object of the present invention is to provide an apparatus configured to electrically set and release a rail car hand brake that includes one or more sensors positioned to sense applied and/or released conditions and provide appropriate output signals to a control circuit.

A further object of the present invention is to provide an apparatus configured to electrically set and release a rail car hand brake that does not increase the vertical load on the drive shaft of the rail car hand brake.

Yet a further object of the present invention is to provide an apparatus configured to electrically set and release a rail car hand brake that includes a slip clutch preventing an overload condition during hand brake application.

An additional object of the present invention is to provide an apparatus configured to electrically set and release a rail car hand brake that includes a series of intermeshed gears.

Another object of the present invention is to provide an apparatus configured to electrically set and release a rail car hand brake that is operable with vertical wheel Groups N, O, Q and R hand brakes.

Yet another object of the present invention is to provide an apparatus configured to electrically set and release a rail car hand brake that can be easily retrofitted on hand brakes currently in use.

A further object of the present invention is to provide an apparatus configured to electrically set and release a rail car hand brake that can be remotely operated from a locomotive, or from a belt-pack or equivalent, to such rail car.

Yet a further object of the present invention is to provide an apparatus configured to electrically set and release a rail car hand brake that indicates applied and released conditions of the rail car hand brake.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
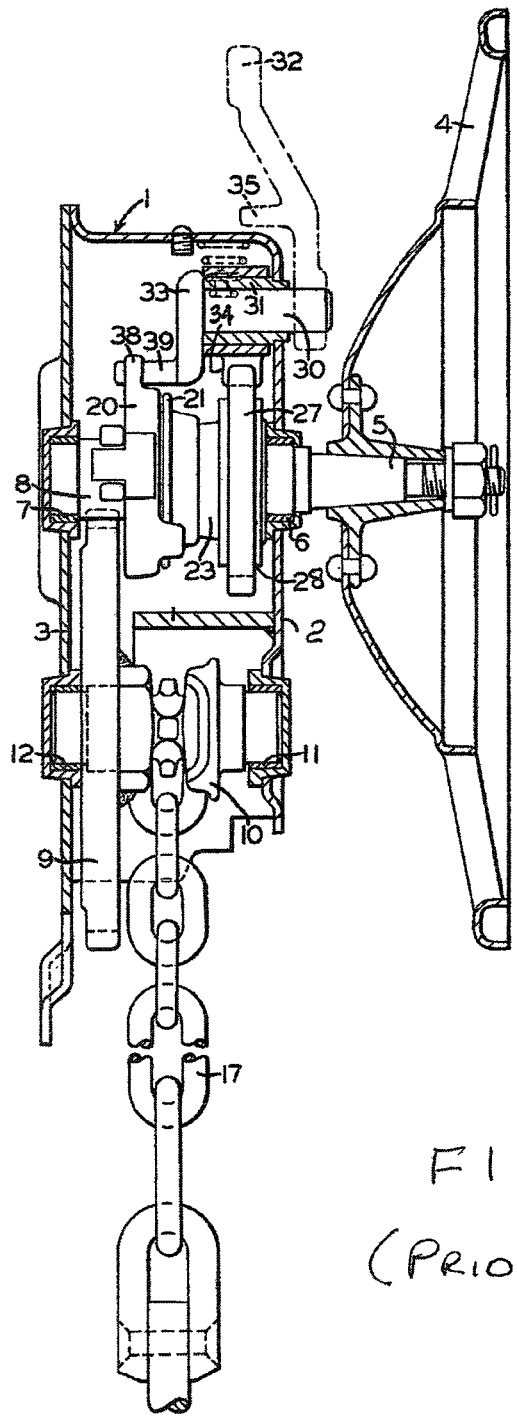
FIG. 1, labeled "Prior Art", is an elevation cross-section view of a hand brake for rail cars.

Prior to proceeding to the more detailed description of the present invention, it should be noted that, for the sake of clarity and understanding, identical components which have identical functions have been identified with identical reference numerals throughout the several views illustrated in the drawing figures.

The present invention is illustrated and described in combination with AAR Groups N, O, Q and R hand brakes, generally designated as 1, although it will be apparent to those skilled in the relevant art that the present invention may be applied to other AAR certified hand brakes and as such should not be interpreted as a limiting factor of the apparatus of the instant invention.

Now in reference to FIG. 1, labeled "Prior Art", therein is illustrated a prior art AAR style hand brake (hereinafter referred to as "hand brake") as shown and described in U.S. Pat. No. 4,368,648 issued on Jan. 18, 1983 to Housman et al. For the sake of reader's convenience, FIG. 1 is essentially FIG. 2 in U.S. Pat. No. 4,368,648.

Briefly, the hand brake 1 comprises a housing having a front plate or wall 2 and a back plate or wall 3. A driving mechanism is disposed in the upper portion of housing 1, as viewed in FIG. 1, the driving mechanism comprising a hand wheel 4 secured to a drive shaft 5, the drive shaft being journaled for rotation in bearings 6 and 7 secured in front plate 2 and back plate 3, respectively.

The drive shaft 5 has secured thereon for rotation therewith, at the end adjacent bearing 7, a pinion 8 which meshes with a gear 9 for rotating a chain drum 10 journaled for rotation in bearings 11 and 12 secured on front plate 2 and back plate 3, respectively, in the lower portion of housing 1. A chain 17 has one end thereof secured to the chain drum 10 and has an opposite end thereof coupled, in a conventional manner, to a truck or car mounted brake rigging (not shown).

Also disposed in the upper portion of housing 1 and associated with the driving mechanism, is a clutch and quick release mechanism 18. The clutch and quick release mechanism 18 comprises an annular stationary cam member (not shown) restrained from both axial and rotational movement, and a movable cam member 20 rotatably disposed concentrically within the stationary cam member (not shown), the movable cam 20 being rotatable relative to the stationary cam member (not shown).

An internally splined annular clutch collar 21 is provided with an annular flange and concentrically surrounds drive shaft 5, the collar engaging with an externally splined nut 23 screwable on a screw-threaded portion 24 of the shaft. Nut 23 makes an abutting contact with one side of a ratchet wheel 27, the other side of the ratchet wheel being abuttable with a friction surface of a friction plate 28 concentrically secured to shaft 5 adjacent bearing 6.

A release shaft 30 is journaled in a release shaft bushing 31 perpendicularly secured in housing front plate 2 above the driving mechanism. A release handle 32 is secured to an external end of release shaft 30 while the other end of the release shaft is provided with a release shaft flange 33, thereby preventing axial displacement of the shaft. A holding pawl 34 is rotatably mounted on release shaft bushing 31 and engages ratchet wheel 27 and is free to ratchet thereon upon rotation in a clockwise direction, as viewed in FIG. 1, of the ratchet wheel. A release handle lug 35 fixed on release handle 32 and a housing side wall limit counterclockwise rotation of release handle 32, while release shaft flange 33 and a housing side wall 37 limit clockwise rotation of release shaft 30 to insure positive linkage between the shaft and a movable cam fork 38 through a pin 39 formed on the shaft and engageable with the fork.

In operation, in order to apply the brakes, hand wheel 4 is rotated clockwise, such rotation being transmitted through drive shaft 5 to cause rotation of gear 9 in a counterclockwise rotation and thereby take-up slack of chain 17. Until such time that tension starts to build up in chain 17, shaft 5, nut 23, and clutch collar 21 all rotate as a unit during rotation of hand wheel 4. When tension begins to build up in chain 17, such tension is reflected in gear 9 and transmitted back to clutch collar 21. Resistance to rotation by clutch collar 21, which is splined to nut 23, causes the nut 23 to advance and thereby clamp ratchet member 27 between friction surfaces. With ratchet 27 so clamped, continued rotation of wheel 4 causes drive shaft 5, the ratchet member, and nuts 23 to rotate as a single unit until the desired tension is attained on chain 17, while holding pawl 34 ratchets on the ratchet member 27. When desired tension has been achieved on chain 17, rotation or application of torque on wheel 4 is terminated, and the holding pawl 34 engaged on clamped ratchet member 27 prevents the chain from unwinding, since the pawl permits only clockwise rotation of the ratchet member 27.

Once applied, the brakes may be released gradually, via the hand wheel, or quickly via a quick-release lever, if installed.

For effecting (causing) a gradual release of the brakes, the hand wheel 4 is turned counterclockwise slightly to partially loosen nut 23 and thereby reduce the clamping force on ratchet member 27, which is restrained from rotation by holding pawl 34. The initial counterclockwise rotation of hand wheel 4 causes a corresponding rotation of the gear 9, thereby easing tension on chain 17. Continued counterclockwise rotation of hand wheel 4 causes complete release of the load on chain 17 with gear 9 continuing to rotate until winding drum 10 releases all chain slack. When all chain slack has been released, further rotation of gear 9 and nut 23 is terminated.

A quick release of the brake application is effected (caused) by lifting/rotating the quick-release handle 32 (which is normally in an applied position) in an upward clockwise direction to a release position which, by engagement of pin 39 with fork 38 of movable cam 20, causes counterclockwise rotation of the movable cam 20. As was hereinbefore noted, stationary cam (not shown) and movable cam 20 are provided with complementary fast-pitch threads, so that as movable cam 20 rotates counterclockwise, it moves axially outwardly of the stationary cam (not shown), in an upwardly direction, and carries with it clutch collar 21 by engagement of flange 22 thereof. Clutch collar 21 is allowed to rotate freely. Stationary cam (not shown) is restrained against both rotational and axial movement. Thus, upward axial movement of movable cam 20 allows the gear 9 to rotate freely for releasing the load on chain 17, while drive shaft 5, nut 23, collar 21, and ratchet 27 are all held stationary by holding pawl 34.

Now in reference to FIGS. 2-7, therein is illustrated an apparatus, generally designated as 100, which is constructed in accordance with a presently preferred embodiment of the invention and which is configured to electrically set and release the hand brake and is further configured to adapt the above described hand brake for either manual operation described above or for a fully powered operation either from a location adjacent the hand brake or from a remote location.

The apparatus 100 includes a power transmission assembly which, in a presently preferred embodiment, is a gear assembly, generally designated as 110. The gear assembly 110 includes a first housing 120. The housing 120 includes a front wall 122 having an exterior or front surface 124, a top wall 126 having an exterior surface 128, a rear wall 130 and a pair of side walls 132.

Two beveled gears 140 and 142 are mounted within a hollow interior 134 of the first housing 120 and are being operatively intermeshed with each other.

Figure 3:
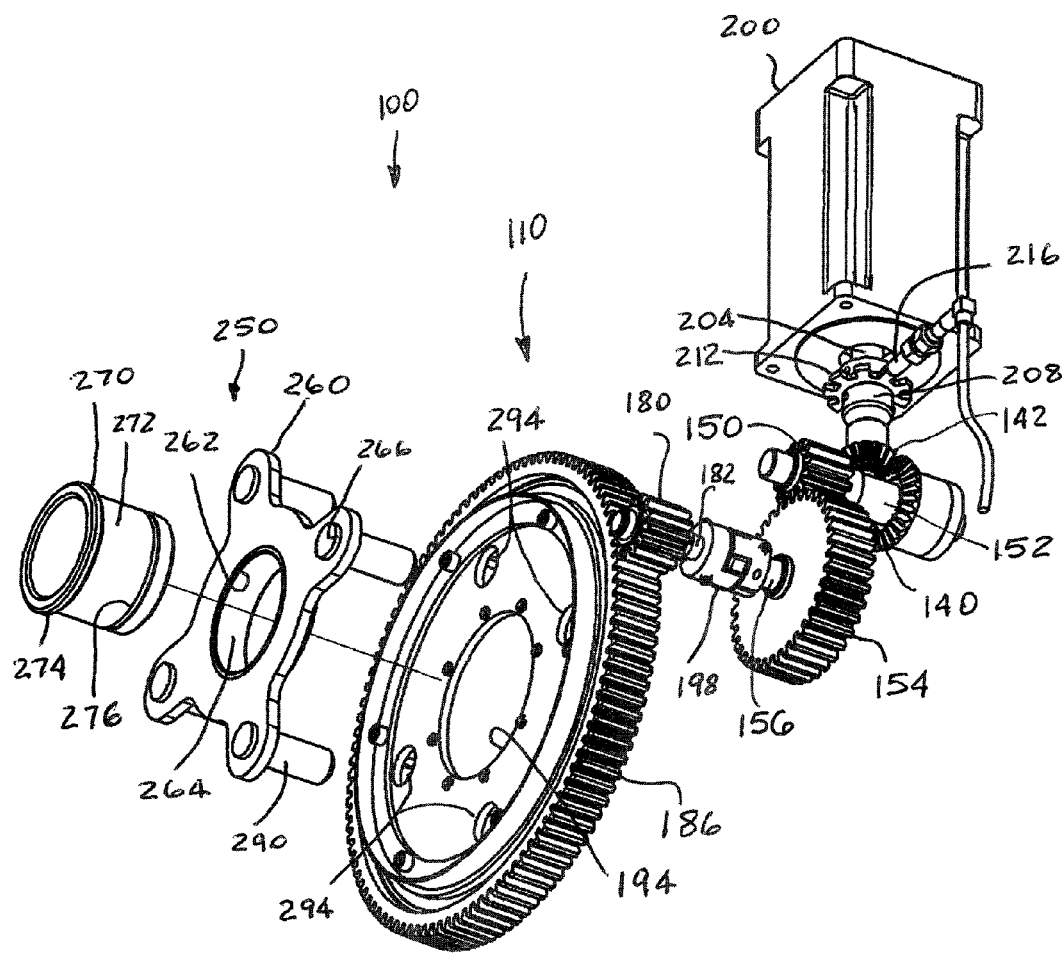
FIG. 3 illustrates a partial front 3-D view of the apparatus of FIG. 2, particularly illustrating the power transmission train.

A first pair of spur gears 150, 156 is also mounted within the hollow interior 134 of the first housing 120 in an intermeshed relationship with each other. One of the first pair of spur gears, referenced with numeral 150 in FIG. 3, is operatively connected to one of the two beveled gears, referenced with numeral 140 in FIG. 3, by a common shaft 152. A shaft 156 of another one of the pair of spur gears, referenced with numeral 154 in FIG. 3, extends outwardly from the front surface 124 of the first housing 120 through an aperture 125 in the front wall 122 of the first housing 120.

There is also a second housing 160, being positioned between the hand wheel 4 and the front surface 124 of the first hand brake housing 120. The second housing 160 has a hollow interior 162, a first aperture 168 formed through a thickness of a rear wall 164 of the second housing 160 and a second aperture 172 formed through a thickness of a front wall 170 thereof in an alignment with the first aperture 168. During use, a common axis of the apertures 168 and 172 lies in a horizontal plane. An annular peripheral flange 174 is positioned within the first aperture 168 in abutment with a peripheral edge thereof but can be also configured to upstand on an exterior surface 166 of the rear wall 164 of the second housing 160 around the peripheral edge of the first aperture 168. The peripheral flange 174 has been illustrated as having an annular shape and is rigidly secured to the rear wall 164, by any of the conventional means, for example such as welding, and has a rigidly secure connection 176 with the front surface of the front plate or wall 2 of the hand brake housing. In operation, the drive shaft 5 extends through a hollow interior of the flange 174 and both apertures 168, 172 of the second housing 160. The rigidly secure connection 176 is configured to decouple operating vertical loads from the drive shaft 5, wherein loads are distributed through the structural housing and flange members and no load is being applied directly to the drive shaft 5.

Figure 4:
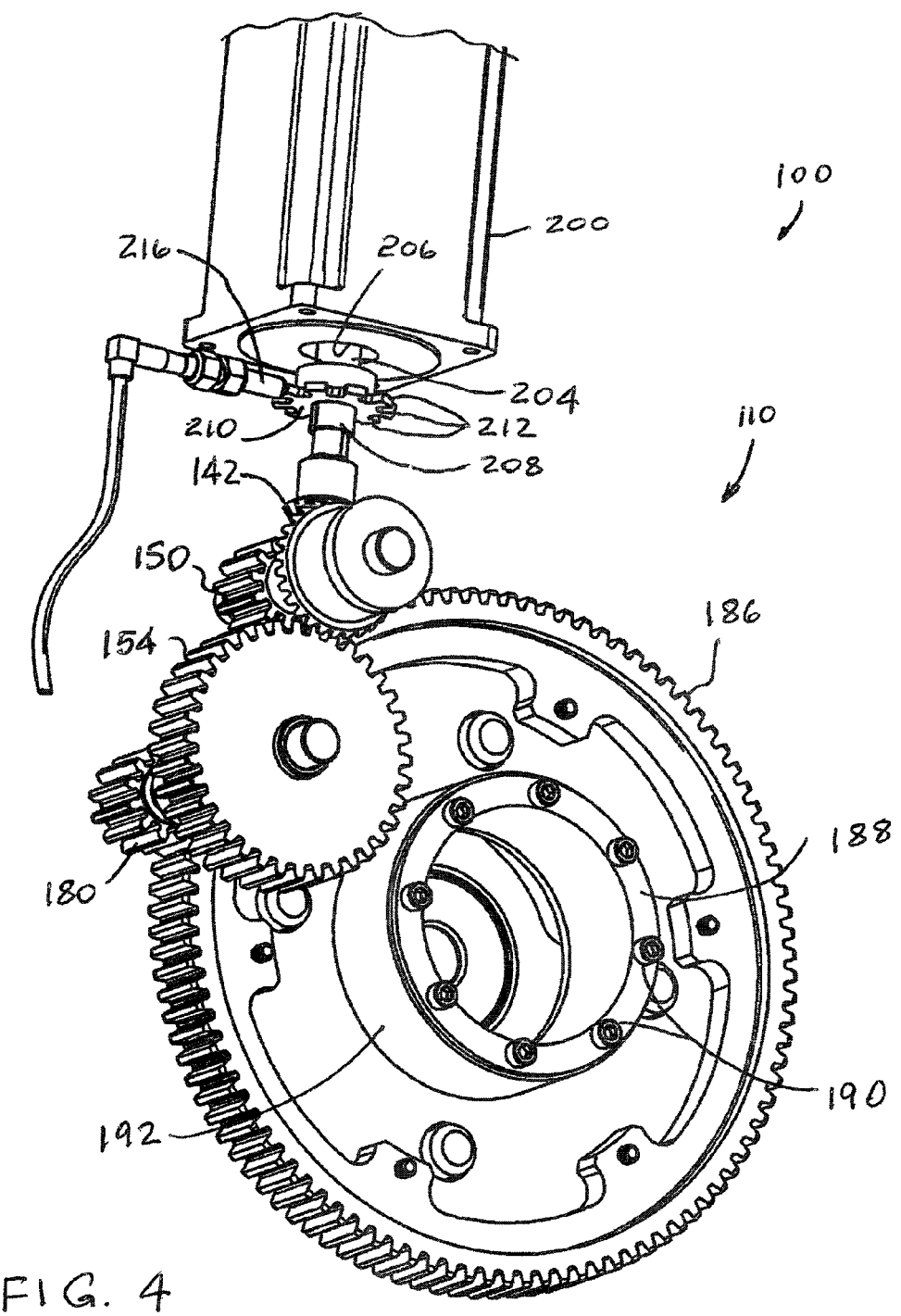
FIG. 4 illustrates a partial rear 3-D view of the apparatus of FIG. 2, particularly illustrating the power transmission train.
Figure 6:
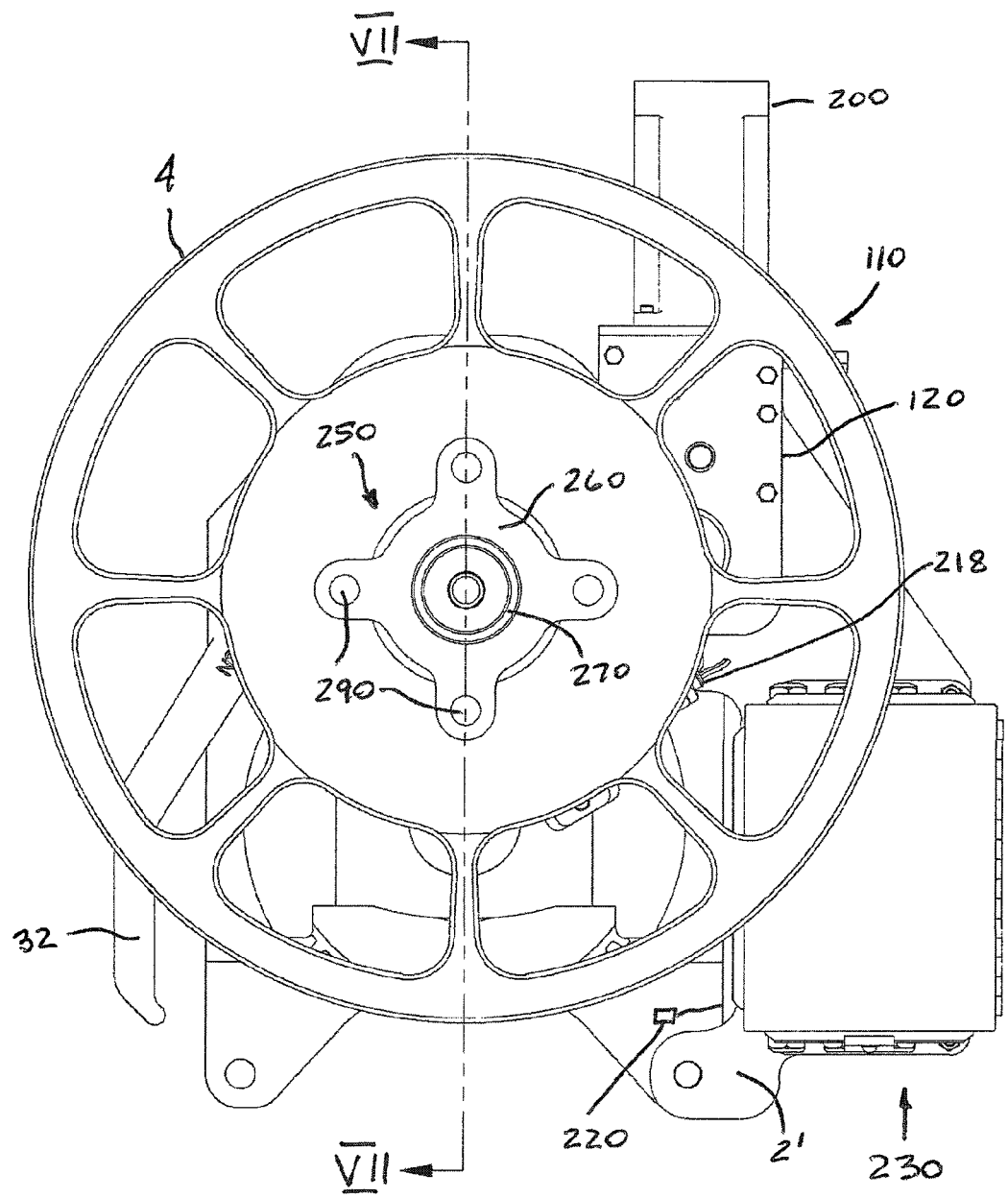
FIG. 6 is a front elevation view of the assembly of FIG. 4.
Figure 7:
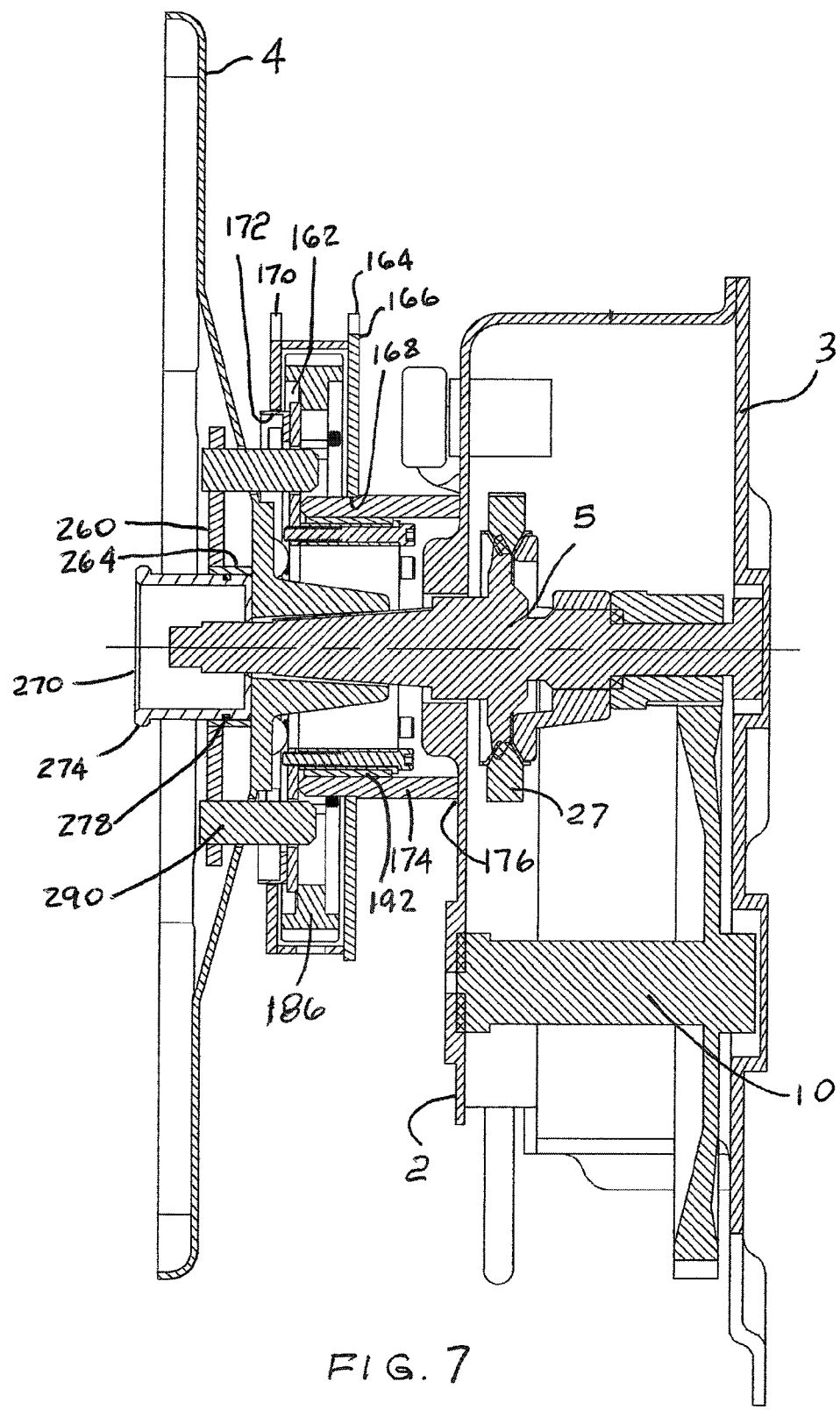
FIG. 7 is an elevation cross-section view of the assembly of FIG. 6 along lines VII-VII.

There is also a second pair of spur gears 180, 186 mounted within the hollow interior 162 of the second housing 160 in an intermeshed relationship with each other, wherein a shaft 182 of one of the second pair of spur gears, referenced with numeral 180 and best shown in FIG. 3, extends through another aperture in the rear wall 164 of the second housing 160 and wherein another one of the second pair of spur gears, referenced with numeral 186 and best shown in FIGS. 3 and 6, is mounted coaxially with the drive shaft 4. The gear 186 has a central annular hub or flange 188 that is shown in FIGS. 4 and 7 as being secured to the surface of the gear 186 with threaded fasteners 190, but that can be also welded thereto or secured with any other conventional means. The exterior peripheral surface of hub or flange 188 carries a bearing or bearing quality bushing 192 having an exterior surface thereof sized to operatively engage interior surface of the flange 174, whereby the gear 186 is mounted for rotation relative to the flange 174. The gear 186 is also provided with a central aperture 194 so as to pass the drive shaft 5 therethrough.

A coupling 198 connects the shaft 182 of the spur gear 180 to the shaft 156 of the spur gear 154.

Figure 2:
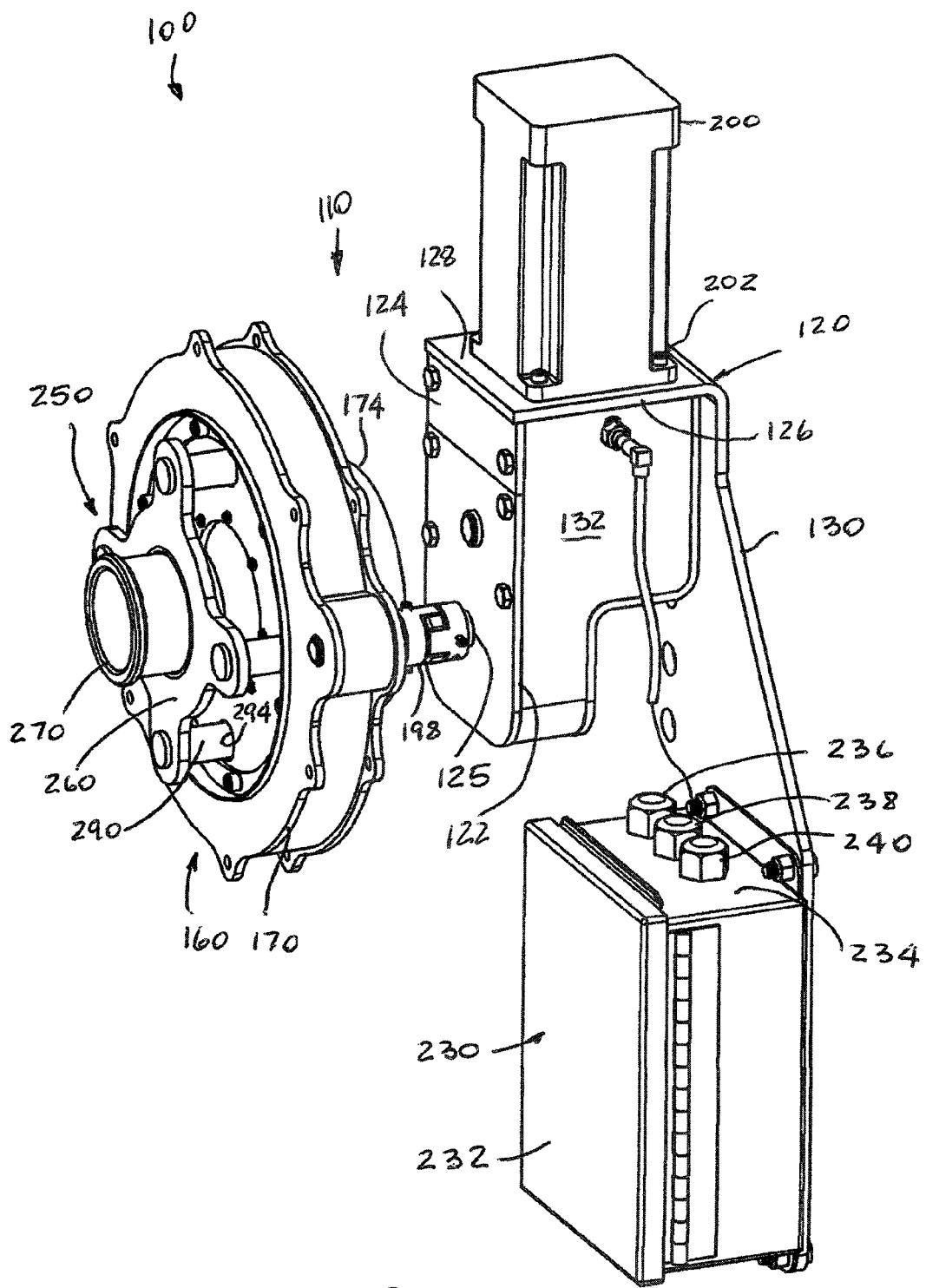
FIG. 2 illustrates a 3-D view of an apparatus of the instant invention, configured to electrically set and release a rail car hand brake.

The apparatus 100 includes an electric motor 200 to set and release hand brake 10 in a power mode. As best shown in FIG. 2, the electric motor 200 upstands on the exterior surface 128 of the top wall 126 of the first housing 120 and is conventionally fastened thereto with threaded fasteners 202. As best shown in FIGS. 3-4, the shaft 204 of the electric motor 200 extends through an aperture 206 in the top wall 126 and is coupled to the bevel gear 142 with a coupling 208.

For the reasons to be described later, the apparatus 100 includes an optional disk 210 mounted within the hollow interior of the first housing 120 between the electric motor 200 and the beveled gear 142 for a rotation therewith. The disk 210 has a plurality of teeth 212 defined on a peripheral edge thereof. There is also provided a proximity sensor 216 that is mounted within the hollow interior of the first housing 120 proximal and normal to the shaft 204 of the electric motor 200 and in a position to sense a presence or an absence of the plurality of teeth 212 during the rotation of the disk 210.

Figure 5:
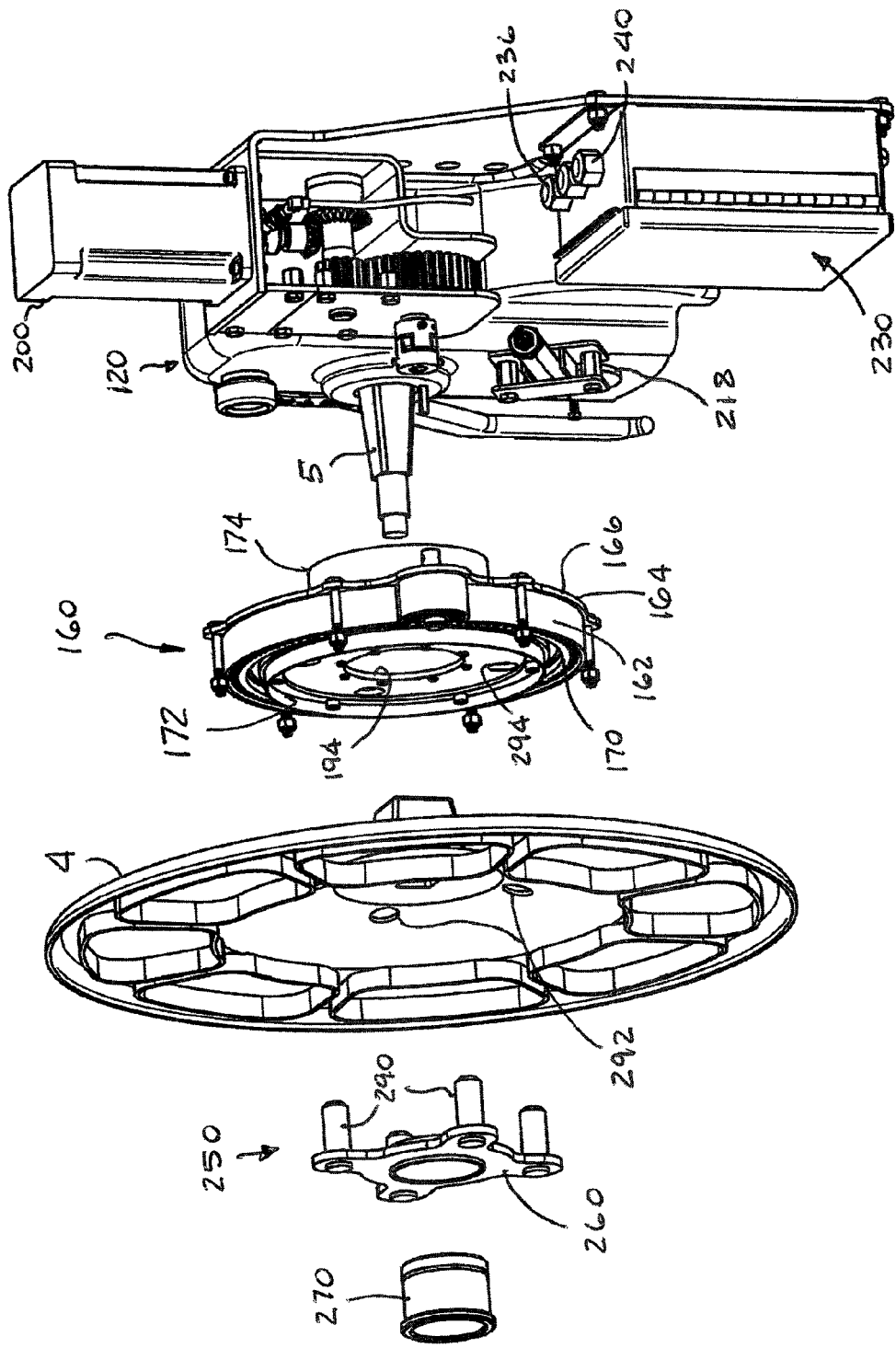
FIG. 5 illustrates a front exploded 3-d view of the assembly of FIG. 3 installed on the hand brake of FIG. 1.

For further reasons to be described later, the apparatus 100 may include another optional sensor 218 and an additional optional sensor 220. As best shown in FIG. 5, the sensor 218 is mounted on an exterior surface of the front wall 2 the hand brake housing in a position to sense the released state of the chain 17. The sensor 218 could be of any suitable type and is preferably of a type as taught in U.S. Pat. No. 6,474,450 owned by the assignee of the instant invention and being incorporated into this document by references thereto.

As best shown in FIG. 6, the sensor 220 is a strain gage rigidly attached to the exterior surface the front wall 2 of the hand brake housing proximal to one lower region 2' where the hand brake housing is fastened to a rail car structure (not shown). It has been found that such lower region 2', that can be also on the opposite left hand side of the hand brake 1 in FIG. 6, is subject to most accurate loads during operation of the hand brake 1, particularly when the chain 17 is being applied. However, it is contemplated that the strain gage 220 may be positioned on other portions of the front wall 2 or even other portions of the hand brake 1.

The sensors 216, 218 and 220 can be provided in combination with each other or the apparatus 100 may only use any one of these sensors by adapting the logic of the controller 230. Output signal from either sensor can be processed to detect either set or released condition of the hand brake 1.

Apparatus 100 further includes a controller, generally designated as 230, that is electrically coupled to the electric motor 200 and to the one or more sensors 216, 218 and 220. The controller 230 is configured to operate the electric motor 200 in accordance with a predetermined logic algorithm so as to move the chain 17 between the released and set states. Essentially, the controller 230 is configured to incrementally move the chain 17 between the released and set states in a response to output signal values from one or more above described sensors and to one or more input signals.

Figure 8:
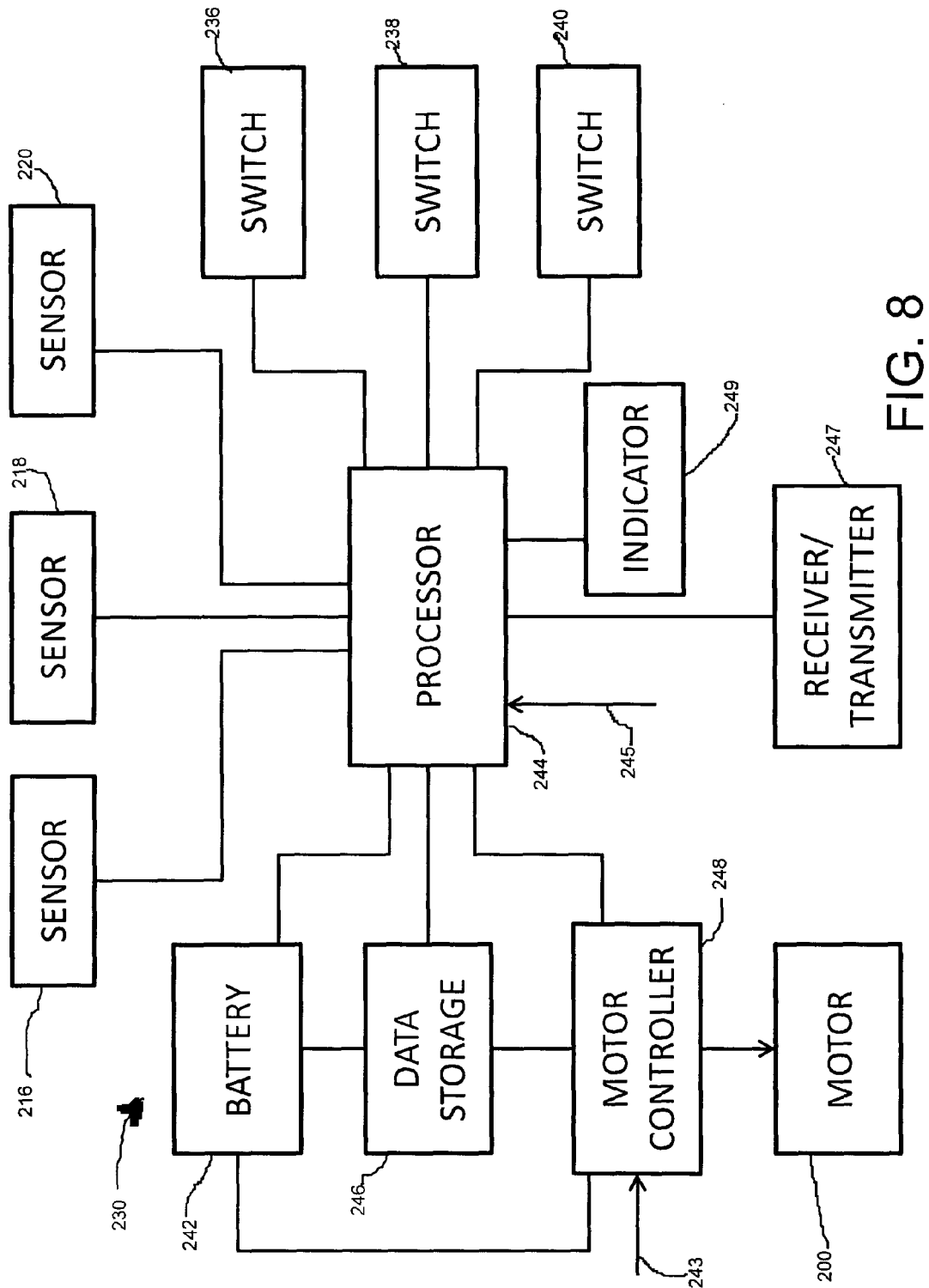
FIG. 8 is a block diagram of a control circuit employed within apparatus of FIG. 2.

Now in reference to FIG. 8, the controller 230 includes manually operable switches 236, 238 and 240, preferably of a conventional pushbutton type and being installed in a top wall 234 of the controller housing 232. Manually operable switches 236, 238 and 240 denote, in no particular order, apply, release, and status actions. The controller 230 further includes a battery 242, a processor 244, a data storage 246, a motor control circuit 248 electrically coupled to the motor 200 and the processor 244, the processor 244 electrically coupled to the first and second sensors, the processor 244 is configured to operate the electric motor 200 in accordance with the predetermined logic algorithm so as to move the chain 17 between the released and set states.

Now in further reference to FIG. 5, the apparatus 100 additionally includes a device, generally designated as 250, being movable between a first position wherein the device 250 engages only the hand wheel 4 and wherein the hand wheel 4 is used to move the chain 17 between the released and set states and a second position wherein the device 250 engages both the hand wheel 4 and a gear in the gear assembly and wherein the electric motor 200 is operable to move the chain 17 between the released and set states.

The device 250 includes a plate 260 having a central aperture 262 formed through a thickness thereof and a plurality of spaced apart apertures 266 formed through the thickness thereof in a region between a peripheral edge of the central aperture 262 and a peripheral edge of the plate 260. The central aperture 262 may be adapted with a flange 264. A sleeve 270 is provided and has an exterior surface 272 thereof sized to be received within the central aperture 262 so that the plate 260 and, more particularly, the flange 264 is mounted for a reciprocal linear movement on the exterior surface 272 of the sleeve 270. The sleeve 270 is also adapted with a flange 274. The sleeve 270 is at least temporarily fixed to the gear 186 by way of the conventional nut (not shown) securing the hand wheel 4 to the drive shaft 5. A groove 276 is provided in the exterior surface 272 of the sleeve 270 proximal to one end thereof. An O-ring 278 is mounted within the groove 276. There are also spaced apart pins 290 rigidly attached to the plate 260, for example being inserted into apertures 266 and welded to the plate 260, the pins 290 extending from one surface of the plate 260 in a direction of the hand wheel 4. Complimentary apertures 292 are formed through a thickness of a center portion of the hand wheel 4 and positioned and sized to receive the pins 290 therethrough. Additional complimentary apertures 294 are formed through a thickness of the gear 186 in the gear assembly 110 and are aligned with the apertures 292 formed through the thickness of the hand wheel 4. The pins 290 engaging the apertures 294 formed through the thickness of the gear 186 of the gear assembly 110 couple the drive shaft 5 to the electric motor 200 and position the hand brake 1 for the power operation and wherein the pins 290 disengaged from the apertures 294 formed through the thickness of the gear 186 decouple the drive shaft 5 from the electric motor 200 and position the hand brake 1 for the manual operation.

Thus, essentially, the device 250 either mechanically couples the apparatus 100 to the hand brake 1 or uncouples such apparatus 100 therefrom.

The operation and use of the apparatus 100 is as follows:

When the apparatus 100 is idle, the controller 230 removes power from any circuitry not required during such idle phase. The processor 244 then enters a sleep mode where it will be awakened upon either a local or remote action, for example an apply button 236 being pressed.

The status/halt pushbutton 240 simply allows one or more indicators 249 to illuminate to show the current status of the hand brake 1. For a short duration following completion of apply and release operations, the one or more indicators 249 remain active displaying the hand brake status eliminating the need to press the status/halt pushbutton at those times. Because of this fact, the processor 244 has been programmed with halt functionality which allows a person tasked with operating the apparatus 100 to halt either application or release of the hand brake 1 if required by pressing the status/halt pushbutton 240 during the operation. If this occurs, the indicator 249 is illuminated to annunciate or indicate an error condition.

The release operation is initiated by actuating the hand brake release switch 238. The first check carried out by the processor 244 is verifying that the hand brake 1 is not already released. If the hand brake 1 is already released, the processor 244 takes no action other than activating one or more status indicators 249 for a short period of time.

If the controller 230 determines that the hand brake 1 is not already released, the controller 230 begins the release operation by starting the motor 200 at a slow speed to overcome the torque requirement to release the hand brake 1. The motor speed is then ramped up slightly at which point the speed is held constant for a programmed duration. The length of this duration is intended to be such that the chain 17 is nearly unloaded and the torque requirements have dropped to near minimum levels. At this point the motor speed is slowly ramped up to a maximum speed to complete the unloading and unwinding of excess chain 17. The release operation completes normally when the controller 230 detects the correct input state from the brake release sensor 218. Upon normal completion the 'Hand brake released' indicator is illuminated for a short duration. If at any point in the release cycle a slip of the motor 200 is detected, the release operation is halted and an error light is illuminated for a short duration.

The apply operation is initiated by actuating the hand brake apply switch 236. The first check carried out by the controller 230 is verifying that the hand brake 1 is not already set. If the hand brake 1 is already set, the controller 230 takes no action other than activating the status indicators for a short period.

If the controller 230 determines that the hand brake 1 is not already set, the controller 230 begins the apply operation by starting the motor 200 at a slow speed to ensure motor synchronization. Motor speed is then ramped to a higher speed for taking up slack of the chain 17. The motor 200 has very low torque capability at this speed. The controller 230 monitors rotation of the motor shaft 204 for slippage by way of means including the disk 210, sensor 216 and a predetermined algorithm executed by the processor 244. Upon slippage detection, the controller 230 drops the motor speed to a slow speed which is capable of delivering the torque required to achieve the prescribed chain load. By design the slack of the chain 17 is taken up by the time the first motor slip occurs. With the motor 200 is operating at the slower speed, the controller 230 once again monitors the rotation of the motor shaft 204 for slippage. Detection of slippage the second time, means that the proper chain load has been achieved and the hand brake 1 is set. At this point an indicator, for example labeled as 'Hand brake applied', is illuminated. The indicator remains illuminated for only a short duration following completion of the operation in order to conserve energy. The slow speed has been chosen in combination with a motor current limit such that motor slippage occurs at the proper chain load. The current limit used for application is lower than for release to ensure that sufficient torque is available for release operations.

For manual operation of the hand brake 1, for example to compensate for inoperable apparatus 100, the plate 260 is simply grasped and moved in a direction away from the hand wheel 4, wherein the pins 290 disengage apertures 294 in the gear 186, thus allowing independent rotation of the hand wheel 4 relative to the gear 186.

For power operation, the pins 190 engage both apertures 292 and 294 and the plate 260 is retained on the sleeve 270 by friction from the O-ring 278.

Advantageously, the electric motor 200 in the presently preferred embodiment is a stepper motor. As is well known, the rotational speed of a stepper motor is determined by the excitation frequency. Because of this fact, the controller 230 determines the motor speed directly, and assuming that the motor 200 remains in synchronization, knows the motor speed. However, there may be circumstances that cause the motor 200 to lose synchronization. The toothed disk 210 and the proximity sensor 216, mounted in a position to detect the presence of the teeth 212 of this disk 210, are provided so that the controller 230 can determine whether or not there is a loss of synchronization. The motor shaft speed is measured by the controller 230 by counting the time between consecutive rising edges or teeth of the signal from the proximity switch 216. Because the motor 200 and feedback disk 210 have differing resolutions, the time captured from the feedback proximity switch 216 may not be directly compared to the motor control signal.

When monitoring is active, the controller 230 determines a minimum and maximum allowable feedback period based upon the currently commanded motor speed and equivalent feedback period. When the measured feedback period exceeds the maximum or drops below the minimum, the controller 230 considers that the motor 200 has lost synchronization.

At any given motor shaft speed, the motor 200 produces a specific amount of shaft torque. As long as the mechanical load on the shaft 204 requires less torque than the motor 200 is capable of producing, the motor 200 will remain in synchronization, which means it will rotate a specific rotational angle each time it receives a 'step' input. If the torque of the mechanical load exceeds the capability of the motor 200, the motor 200 will not respond to 'step' with a rotation of a specific shaft angle. Furthermore, if a rotational torque greater than the motor capacity is applied to the motor shaft 204 in the opposite direction of the motor drive, the load torque can actually rotate the motor 200 backwards against the active electrically commanded direction. In either case of slippage, the motor 200 is considered to suffer from a loss of synchronization.

The instant invention provides for detecting slippage, or loss of motor shaft rotation synchronization, by the controller program in two different approaches as described below.

Approach 1 requires checking for motor shaft 204 rotating too slow. A timer is configured in the controller 230 to time the duration between rising edges or teeth 212 of the feedback clock signal from the sensor 216. The timer has a clock frequency and therefore a related resolution. Each execution of the program's interrupt vector calculates a maximum value to compare to the value in the timer register. This calculated value is computed as the nominal timer value based on the currently commanded motor speed plus 75%. Each cycle of the program checks if the value in the timer exceeds the calculated limit. If the timer value is greater than the calculated value, the motor shaft 204 is rotating slower than commanded and there has been a longer than nominal delay between rising edges of the feedback clock.

Approach 2 requires checking for motor shaft 204 rotating too fast. The motor 200 can actually turn faster than commanded when the load of the hand brake 1 exceeds the capacity of the motor 200, which causes the hand brake 1 to unwind slightly while rotating the motor shaft 204 in a direction opposite the currently commanded direction (this happens only during application cycles). The same timer used in the detection detailed above is used for this detection, and therefore the frequency and resolution are the same as above. Each execution of the program's interrupt vector calculates a minimum value to compare to the value in the timer register. This calculated value is computed as the nominal timer value based on the currently commanded motor speed minus 18%. Each time a rising edge or tooth 212 is detected on the feedback clock, the program checks if the value in the timer is below the calculated limit, before resetting the timer. If the timer value is below the calculated value, the motor shaft 204 is rotating faster than commanded and there has been a shorter than nominal delay between rising edges or teeth 212 of the feedback clock. It must be noted that the comparison values are calculated for each interrupt vector, however, they may only need to be calculated each time the speed command changes. The instant invention also contemplates that the slippage of the motor shaft 204 can be detected by any other methods.

Thus, the disk 210, proximity sensor 216 and the processor 244 executing a logic algorithm provides means for detecting a slip condition of the electric motor 200 operating to move the chain 17 between the released and set states.

The controller 230 uses the fact that the output torque of the motor 200 can be controlled to determine that ample torque has been applied to the hand brake hand wheel 4 to consider the hand brake 1 being correctly applied. The input to the motor 200 allowing the motor 200 to generate torque large enough to produce a sufficient chain load can be determined in a number of ways, including laboratory experimentation. The program in the processor 244 is then set to drive the motor 200 with this input and then monitor the motor 200 for loss of synchronization (slippage). When the motor 200 loses synchronization, the mechanical load has exceeded the motor capacity. Because the motor capacity is known, it is assumed that the mechanical input to the system was appropriate to produce sufficient chain loading at this point, and thus proper hand brake application.

Thus, during hand brake application, the motor 200 is initially run at a higher speed (and thus lower torque capacity) to quickly wind up excess chain (which requires lower torque). The motor 200 is monitored for loss of synchronization, and when it is detected, the mechanical load has become greater than the capability of the motor 200 at that electrical input (due to excess chain being wound and chain tension beginning to rise). At this point the motor 200 is slowed and driven with the electrical input as described above which is capable of producing the required chain tension.

During hand brake release, the motor 200 is monitored for loss of synchronization as well. In this case the monitoring is to detect a problem with the overall system. The program is configured to drive the motor 200 sufficiently to complete a release cycle. If the motor 200 loses synchronization during the release cycle, the torque required to perform the release has exceeded the programmed torque output of the motor 200. This typically indicates a problem with the system and when this occurs, an error indication is illuminated and the cycle is halted.

The output torque capacity of the motor 200 is controlled by two variables. The first is the commanded shaft speed. Slower shaft speeds allow the motor 200 to produce higher torques. The other way to control the motor 200 torque is through a control method called chopping where the motor 200 is driven, for small durations, at a voltage higher than motor 200 is capable of withstanding for extended durations. Because the motor 200 is inductive, it resists changes in current. Driving the motor 200 at a higher voltage allows the current to rise to the appropriate drive level quicker, resulting in a better motor performance. The current is monitored and the motor drive is 'chopped' when the set drive current is reached. Because the motor torque is proportional to the drive current, the torque can be controlled by adjusting the drive current set point. Such motor control circuit 248 can be configured by using a commercially available integrated circuit (IC). Processor 244 provides operational parameters such as speed, direction, and current limit, and the stepper driver IC drives the MOSFETs (transistor switches) within the motor control circuit 248 which then drives the stepper motor 200.

It is also contemplated that the motor 200 can be configured and provided with more torque than required for successful application. In this case, the motor torque is limited during application to achieve appropriate chain load, and then the motor 200 is ran at full capacity during release to ensure successful release cycles.

The strain gage 220 is used to provide an input to the controller 230 indicating that the apparatus 100 has operated sufficiently for the hand brake 1 to reach the set condition. Because, the output of the strain gage 220 may not be exactly proportional to the chain load, the instant invention contemplates for adjustment factors to be programmed within the processor 244. However, since the output of the strain gage 220 is generally or substantially proportional to the chain load, albeit some tolerance variations, the controller 230 can be configured to provide for incremental or partial release or set condition of the chain 17, for example by providing a separate switch (not shown), or using a combination of the existing switches substantially at the same time, except for minor timing deviations, for example by actuating the status/halt switch 240 and the apply switch 236 to incrementally take up chain 17.

The advantage of the battery 242 is in that the apparatus 100 is independent from any external power sources. However, it is contemplated that at least the motor control circuit 248 may be coupled to a source of external power 342 in applications having such external power being readily available.

Thus, the hand brake 1 equipped with the apparatus 100 of the instant invention does not require any significant physical effort by a human to release or apply hand brake 1 and indicates to the operator when it is fully applied (set) and fully released, which makes it more likely that operators will indeed apply and release hand brakes when needed.

The hand brake 1 equipped with the apparatus 100 of the instant invention is configured to maintain the required clearances as set forth in the AAR Manual of Standards and Recommended Practices (MSRP) standard S-475, paragraph 1.2.6, wherein an overall depth of the complete hand brake unit (outer face of the hand wheel to the brake's mounting surface) must not exceed 10¾ inches and wherein clearance between the rim of the wheel and any part of the housing must not be less than 4¼ inches. Furthermore, the apparatus 100 ensures the hand brake 1 can be applied and released via electrical power, does not affect the normal manual operation of the hand brake, operationally complies with other appropriate AAR MSRP standards, and generates hand brake forces as specified in AAR MSRP standard S-475, paragraph 1.2.4.1

The advantages of the hand brake 1 equipped with the apparatus 100 of the instant invention over current hand brakes include:

1. Eliminates need to climb ladders to apply and release hand brakes;
2. Eliminates need to go between cars to apply and release hand brakes;
3. Eliminates the action of physically, manually, applying 125 lbs. tangentially on the hand wheel rim;
4. Eliminates the action of physically, manually, releasing the hand brake;
5. When applied, ensures a fully applied (set) hand brake;
6. When released, ensures a fully released hand brake;
7. Increases the probability of both the application and release of hand brakes when needed due to the improved ergonomic nature of pushing buttons instead of physically manipulating the hand wheel;
8. Reduces the risk of wheel flats due to un-released hand brakes upon train movement because it makes it much easier to release hand brakes and know that they are released;
9. Ensures readily available feedback of the status of a hand brake;
10. Includes a device so as to allow for normal manual set and release of the hand brake if needed. When apparatus 100 is disengaged from the hand brake 1, the hand brake 1 retains all certified and proven normal AAR required functions for use in the manual mode;

11. Testing verified that once an application cycle is terminated and the hand brake 1 is set, the mechanical pawl 34 of the hand brake 1 holds the final resting load as per the applicable AAR specification.

Although the present invention has been shown in terms of the gear assembly 110 employing spur and bevel gears, it will be apparent to those skilled in the art, that the present invention may be applied to other power transmissions means, devices or assemblies. For example, worm drive, internal spur gears, chain and sprocket, belt and pulley, cable and pulley arrangements can be employed either independently or in combination with the gears shown in FIGS. 2-7. Furthermore, the number and type of gears depends on a specific application and should not be considered as a limiting factor of the invention. The invention contemplates that the first pair of gears 150, 154 may be eliminated with the gear 180 being connected directly to the beveled gear 142 in applications requiring conventional hand wheel 4 and drive shaft 5. Yet, in other applications, gears 180 and 186 may be removed with a hand wheel and device 150 coupled to a modified gear 154.

Motor 200, although shown as being disposed in a vertical plane with a downwardly facing shaft 204 can be disposed in any position/plane in applications where the space envelope clearances are not critical.

The housings 120 and 160 may be provided by a single housing, particularly if the apparatus 100 is to be used without the hand brake 1.

Furthermore, the controller 230, although shown as being operated by personnel disposed in close proximity thereto, can be operated remotely, for example from a locomotive cab or belt-pack (not shown), by way of adding a conventional wireless receiver and/or receiver/transmitter 247 or by way of a hard wired signal connection 245.

Finally, although the apparatus 100 has been provided in a combination with the hand brake 1 for use on rail cars, particularly of a freight type, the apparatus 100, as described or shown, or in a modified form, to meet a particular application, can be employed as an independent brake mechanism.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. An apparatus comprising:
 (a) a hand brake including a hand brake housing, a drum mounted for rotation within said hand brake housing and having a chain supported thereon, a gear mounted within said hand brake housing coaxially with said drum, a mechanism manually operable to move said chain between released and set states, said mechanism at least including a drive shaft, a pinion mounted within said hand brake housing on a proximal end of said drive shaft and engageable with said gear, and a hand wheel mounted on a distal end of said drive shaft for a rotation therewith, said distal end disposed external to a front surface of said hand brake housing;
 (b) a power transmission assembly disposed between said front surface of said hand brake housing and said hand wheel;
 (c) an electric motor coupled to said power transmission assembly;
 (d) one or more sensors configured to sense at least one of said released and set states;
 (e) a controller coupled to said electric motor and to said one or more sensors, said controller is configured to operate said electric motor in accordance with a predetermined logic algorithm so as to move said chain between said released and set states; and
 (f) a device being movable between a first position wherein said device engages only said hand wheel and wherein said hand wheel is manually operable to move said chain between said released and set states and a second position wherein said device engages both said hand wheel and said power transmission assembly and wherein said electric motor is operable to move said chain between said released and set states.

2. The apparatus of claim 1, wherein said power transmission assembly is a gear assembly comprising a gear mounted coaxially with said drive shaft, a housing enclosing said gear and having a hollow flange extending from a rear wall of said housing and having a rigid connection with a front wall of the hand brake housing, said rigid connection configured to decouple operating vertical loads from said drive shaft.

3. The apparatus of claim 1, wherein said power transmission assembly is a gear assembly including:
 (a) a first housing;
 (b) two beveled gears mounted within a hollow interior of said first housing and being intermeshed with each other, one of said two beveled gears is coupled to said electric motor;
 (c) a first pair of spur gears mounted within said hollow interior of said first housing in an intermeshed relationship with each other, wherein one of said first pair of spur gears is operatively connected to one of said two beveled gears by a common shaft and wherein a shaft of another one of said pair of spur gears extends outwardly from a front surface of said first housing through an aperture in a front wall of said first housing;
 (d) a second housing positioned between said hand wheel and said front surface of said hand brake housing, said second housing having a hollow interior, a first aperture formed through a thickness of a rear wall of said second housing and a second aperture formed through a thickness of a front wall thereof in an alignment with said first aperture, a peripheral flange upstanding on an exterior surface of said rear wall of said second housing around a peripheral edge of said first aperture, said flange having a rigidly secure connection with said front surface of said hand brake housing, wherein said drive shaft extends through said flange and said second aperture in said front wall of said second housing and wherein said rigidly secure connection is configured to decouple retrofit/operating vertical loads from said drive shaft;
 (e) a second pair of spur gears mounted within a hollow interior of said second housing in an intermeshed relationship with each other, wherein a shaft of one of said second pair of spur gears extends through another aperture in said rear wall of said second housing and wherein another one of said second pair of spur gears is mounted coaxially with said drive shaft; and
 (f) a coupling connecting said shaft of said another one of said first pair of spur gears to said shaft of said one of said second pair of spur gears.

4. The apparatus of claim 3, further comprising:
 (a) a disk mounted within said hollow interior of said first housing between said electric motor and said one beveled gear for a rotation therewith, said disk having a plurality of teeth defined on a peripheral edge thereof; and (b) wherein said one or more sensors is a proximity sensor mounted within said hollow interior of said first housing in a position to sense a presence or an absence of said plurality of teeth during said rotation of said disk.

5. The apparatus of claim 1, wherein said apparatus includes means for detecting a slip condition of said electric motor moving said chain between said released and set states.

6. The apparatus of claim 5, wherein said means includes said one or more sensors includes a proximity sensor, a toothed disk attached to a shaft of said electric motor for rotation therewith and aligned with a thickness of said toothed disk, and wherein said controller executes a predetermined algorithm to operate said electric motor so that said slip conditions occurs when the chain is at least one of set and released.

7. The apparatus of claim 1, wherein said one or more sensors is a strain gage rigidly attached to a surface of the hand brake housing proximal to one lower region where the hand brake housing is fastened to a rail car structure and inwardly from a bottom edge of the handbrake housing.

8. The apparatus of claim 1, wherein said one or more sensors is a strain gage rigidly attached to a surface of the hand brake housing.

9. The apparatus of claim 8, wherein said controller is configured to incrementally move said chain between said released and set states in a response to output signal values from said strain gage.

10. The apparatus of claim 1, wherein said one or more sensors is a sensor mounted on an exterior surface of said hand brake housing in a position to sense said released state of said chain.

11. The apparatus of claim 1, wherein said device includes:
(a) a plate having a central aperture formed through a thickness thereof and a plurality of spaced apart apertures formed through said thickness thereof in a region between a peripheral edge of said central aperture and a peripheral edge of said plate;
(b) a sleeve having an exterior surface thereof sized to be received within said central aperture so that said plate is mounted for a reciprocal linear movement on said exterior surface of said sleeve;
(c) a groove provided in said exterior surface of said sleeve proximal to one end thereof;
(d) an O-ring mounted within said groove;
(e) spaced apart pins rigidly attached to said plate and extending from one surface thereof in a direction of said hand wheel;
(f) apertures formed through a thickness of a center portion of said hand wheel and positioned and sized to receive said pins therethrough;
(g) apertures formed through a thickness of a gear in said gear assembly and aligned with said apertures formed through said thickness of said hand wheel, said gear mounted coaxially with said drive shaft; and
(h) wherein said pins engaging said apertures formed through said thickness of said gear of said gear assembly couple said drive shaft to said electric motor and position said hand brake for said power operation and wherein said pins disengaged from said apertures formed through said thickness of said gear decouple said drive shaft from said electric motor and position said hand brake for said manual operation.

12. The apparatus of claim 1, wherein said one or more sensors is a proximity sensor mounted proximal and normal to a shaft of said electric motor, wherein said apparatus further comprises a toothed disk attached, in alignment with a sensor, to said shaft of said electric motor for rotation therewith and wherein said controller is configured to identify a slip condition of said electric motor in response to one or more signals from said proximity sensor.

13. The apparatus of claim 1, wherein said controller is configured to receive input command signals from a remote location.

14. An apparatus for a hand brake having a hand brake housing, a drum mounted for a rotation within said hand brake housing and having a chain supported thereon, a mechanism manually operable to move the chain between released and set states, the mechanism at least including a drive shaft and a hand wheel mounted on a distal end of the drive shaft for rotation therewith, the distal end disposed external to a front surface of the hand brake housing, said apparatus comprising:
(a) a first housing;
(b) two beveled gears mounted within a hollow interior of said first housing and being intermeshed with each other;
(c) a first pair of spur gears mounted within said hollow interior of said first housing in an intermeshed relationship with each other, wherein one of said first pair of spur gears is operatively connected to one of said two beveled gears by a common shaft and wherein a shaft of another one of said pair of spur gears extends outwardly from a front surface of said first housing through an aperture in a front wall of said first housing;
(d) an electric motor fastened to a top surface of said first housing and coupled to a shaft of another beveled gear;
(e) a disk mounted within said hollow interior of said first housing between said electric motor and said one beveled gear for a rotation therewith, said disk having a plurality of teeth defined on a peripheral edge thereof;
(f) a first sensor mounted within said hollow interior of said first housing in a position to sense a presence or an absence of said plurality of teeth during said rotation of said disk;
(g) a second sensor mounted on said front surface of said hand brake housing in a position to sense said release or set states of said chain;
(h) a second housing positioned between said hand wheel and said front surface of said hand brake housing, said second housing having a hollow interior, a first aperture formed through a thickness of a rear wall of said second housing and a second aperture formed through a thickness of a front wall thereof in an alignment with said first aperture, a peripheral flange upstanding on an exterior surface of said rear wall of said second housing around a peripheral edge of said first aperture, said flange having a rigidly secure connection with said front surface of said hand brake housing, wherein said drive shaft extends through said flange and said second aperture in said front wall of said second housing and wherein said rigidly secure connection is configured to decouple operating vertical loads from said drive shaft;
(i) a second pair of spur gears mounted within a hollow interior of said second housing in an intermeshed relationship with each other, wherein a shaft of one of said second pair of spur gears extends through another aperture in said rear wall of said second housing and wherein another one of said second pair of spur gears is mounted coaxially with said drive shaft;

(j) a coupling connecting said shaft of said another one of said first pair of spur gears to said shaft of said one of said second pair of spur gears;
(k) a device configured to selectively position said hand brake for a manual operation, wherein said hand wheel is used to move said chain between said released and set states and for a powered operation wherein said electric motor is operable to move said chain between said released and set states, said device including:
  i. a plate having a central aperture formed through a thickness thereof and a plurality of spaced apart apertures formed through said thickness thereof in a region between a peripheral edge of said central aperture and a peripheral edge of said plate,
  ii. a sleeve having an exterior surface thereof sized to be received within said central aperture so that said plate is mounted for a reciprocal linear movement on said exterior surface of said sleeve,
  iii. a groove provided in said exterior surface of said sleeve proximal to one end thereof,
  iv. an O-ring mounted within said groove,
  v. spaced apart pins rigidly attached to said plate and extending from one surface thereof in a direction of said hand wheel,
  vi. apertures formed through a thickness of a center portion of said hand wheel and positioned and sized to receive said pins therethrough,
  vii. apertures formed through said thickness of said front wall of said second housing in alignment with said apertures formed through said thickness of said hand wheel,
  viii. apertures formed through a thickness of said another one of said second pair of spur gears mounted coaxially with said drive shaft and aligned with said apertures formed through said thickness of said front wall of said second housing, and
  ix. wherein said pins engaging said apertures formed through said thickness of said another one of said second pair of spur gears couple said drive shaft to said electric motor and position said hand brake for said power operation and wherein said pins disengaged from said apertures formed through said thickness of said another one of said second pair of spur gears decouple said drive shaft from said electric motor and position said hand brake for said manual operation;
(l) a strain gage secured to a surface of the hand brake housing; and
(m) a controller including manually operable switches, a battery, a processor, a data storage, a motor control circuit electrically coupled to said motor and said processor, said processor electrically coupled to said first and second sensors and said strain gage, said processor is configured to operate said electric motor in accordance with a predetermined logic algorithm so as to move said chain between said released and set states.

15. An apparatus for a hand brake having a hand brake housing, a drum mounted for rotation within the hand brake housing and having a chain supported thereon, a mechanism manually operable to move the chain between released and set states, the mechanism at least including a drive shaft and a hand wheel mounted on a distal end of the drive shaft for rotation therewith, the distal end disposed external to a front surface of the draft gear housing, said apparatus comprising:
(a) an electric motor;
(b) a power transmission assembly coupled to said electric motor;
(c) a strain gage rigidly attached to the exterior surface of the hand brake housing proximal to one lower region where the hand brake housing is fastened to a rail car structure, said strain gage configured to sense at least one of said released and set states;
(d) a controller coupled to said electric motor and to said strain gage, said controller is configured to operate said electric motor in accordance with a predetermined algorithm so as to move said chain between said released and set states in a proportional response to output signal values from said strain gage.

16. The apparatus of claim 15, further comprising a device being manually movable between a first position wherein said device engages only said hand wheel and wherein said hand wheel is manually operable to move said chain between said released and set states and a second position wherein said device engages both said hand wheel and a gear in said power transmission assembly and wherein said electric motor is operable to move said chain between said released and set states.

17. The apparatus of claim 1, wherein said apparatus is configured to maintain required clearances as set forth in an Association of American Railroads (AAR) Manual of Standards and Recommended Practices (MSRP) standard S-475, paragraph 1.2.6.

18. The apparatus of claim 1, wherein said apparatus is configured to generate hand brake forces as specified in AAR MSRP standard S-475, paragraph 1.2.4.1.

19. An apparatus for a hand brake having a hand brake housing, a drum mounted for rotation within the hand brake housing and having a chain supported thereon, a gear mounted within the hand brake housing coaxially with said drum, a mechanism manually operable to move the chain between released and set states, the mechanism at least including a drive shaft, a pinion mounted within the hand brake housing on a proximal end of the drive shaft and engageable with the gear and a hand wheel mounted on a distal end of the drive shaft for rotation therewith, the distal end disposed external to a front surface of the hand brake housing, said apparatus comprising:
(a) a power transmission assembly including:
  i. a first housing,
  ii. two beveled gears mounted within a hollow interior of said first housing and being intermeshed with each other, one of said two beveled gears is coupled to said electric motor,
  iii. a first pair of spur gears mounted within said hollow interior of said first housing in an intermeshed relationship with each other, wherein one of said first pair of spur gears is operatively connected to one of said two beveled gears by a common shaft and wherein a shaft of another one of said pair of spur gears extends outwardly from a front surface of said first housing through an aperture in a front wall of said first housing,
  iv. a second housing positioned between said hand wheel and said front surface of said hand brake housing, said second housing having a hollow interior, a first aperture formed through a thickness of a rear wall of said second housing and a second aperture formed through a thickness of a front wall thereof in an alignment with said first aperture, a peripheral flange upstanding on an exterior surface of said rear wall of said second housing around a peripheral edge of said first aperture, said flange having a rigidly secure connection with said front surface of said hand brake housing, wherein said drive shaft extends through said flange and said second aperture in said front wall of said second housing and wherein said rigidly secure connection is configured to decouple retrofit/operating vertical loads from said drive shaft,
    v. a second pair of spur gears mounted within a hollow interior of said second housing in an intermeshed relationship with each other, wherein a shaft of one of said second pair of spur gears extends through another aperture in said rear wall of said second housing and wherein another one of said second pair of spur gears is mounted coaxially with said drive shaft, and
    vi. a coupling connecting said shaft of said another one of said first pair of spur gears to said shaft of said one of said second pair of spur gears;
(b) an electric motor coupled to said power transmission assembly;
(c) a disk mounted within said hollow interior of said first housing between said electric motor and said one beveled gear for a rotation therewith, said disk having a plurality of teeth defined on a peripheral edge thereof;
(d) a proximity sensor mounted within said hollow interior of said first housing in a position to sense a presence or an absence of said plurality of teeth during said rotation of said disk;
(e) a controller coupled to said electric motor and to said one or more sensors, said controller is configured to operate said electric motor in accordance with a predetermined logic algorithm so as to move said chain between said released and set states; and
(f) a device being movable between a first position wherein said device engages only the hand wheel and wherein said hand wheel is manually operable to move the chain between said released and set states and a second position wherein said device engages both the hand wheel and said power transmission assembly and wherein said electric motor is operable to move the chain between said released and set states.

20. An apparatus for a hand brake having a hand brake housing, a drum mounted for rotation within the hand brake housing and having a chain supported thereon, a gear mounted within the hand brake housing coaxially with said drum, a mechanism manually operable to move the chain between released and set states, the mechanism at least including a drive shaft, a pinion mounted within the hand brake housing on a proximal end of the drive shaft and engageable with the gear and a hand wheel mounted on a distal end of the drive shaft for rotation therewith, the distal end disposed external to a front surface of the hand brake housing, said apparatus comprising:

(a) a power transmission assembly;
(b) an electric motor coupled to said power transmission assembly;
(c) one or more sensors configured to sense at least one of said released and set states;
(d) a controller coupled to said electric motor and to said one or more sensors, said controller is configured to operate said electric motor in accordance with a predetermined logic algorithm so as to move said chain between said released and set states; and
(e) a device being movable between a first position wherein said device engages only the hand wheel and wherein said hand wheel is manually operable to move the chain between said released and set states and a second position wherein said device engages both the hand wheel and said power transmission assembly and wherein said electric motor is operable to move the chain between said released and set states, said device including:
    i. a plate having a central aperture formed through a thickness thereof and a plurality of spaced apart apertures formed through said thickness thereof in a region between a peripheral edge of said central aperture and a peripheral edge of said plate,
    ii. a sleeve having an exterior surface thereof sized to be received within said central aperture so that said plate is mounted for a reciprocal linear movement on said exterior surface of said sleeve,
    iii. a groove provided in said exterior surface of said sleeve proximal to one end thereof,
    iv. an O-ring mounted within said groove,
    v. spaced apart pins rigidly attached to said plate and extending from one surface thereof in a direction of said hand wheel,
    vi. apertures formed through a thickness of a center portion of said hand wheel and positioned and sized to receive said pins therethrough,
    vii. apertures formed through a thickness of a gear in said gear assembly and aligned with said apertures formed through said thickness of said hand wheel, said gear mounted coaxially with said drive shaft, and
    viii. wherein said pins engaging said apertures formed through said thickness of said gear of said gear assembly couple said drive shaft to said electric motor and position said hand brake for said power operation and wherein said pins disengaged from said apertures formed through said thickness of said gear decouple said drive shaft from said electric motor and position said hand brake for said manual operation.

* * * * *